United States Patent
Bierner et al.

(10) Patent No.: US 12,321,355 B2
(45) Date of Patent: Jun. 3, 2025

(54) UNIFIED SEARCH SYSTEMS AND METHODS

(71) Applicant: Ancestry.com Operations Inc., Lehi, UT (US)

(72) Inventors: Gann Bierner, Oakland, CA (US); Robert Weis, Oakland, CA (US)

(73) Assignee: Ancestry.com Operations Inc., Lehi, UT (US)

( * ) Notice: Subject to any disclaimer, the term of this patent is extended or adjusted under 35 U.S.C. 154(b) by 0 days.

(21) Appl. No.: 18/382,038

(22) Filed: Oct. 19, 2023

(65) Prior Publication Data

US 2024/0134865 A1 Apr. 25, 2024
US 2024/0232207 A9 Jul. 11, 2024

Related U.S. Application Data

(60) Provisional application No. 63/418,429, filed on Oct. 21, 2022.

(51) Int. Cl.
G06F 16/2457 (2019.01)
G06F 18/2415 (2023.01)

(52) U.S. Cl.
CPC .... *G06F 16/24575* (2019.01); *G06F 18/2415* (2023.01)

(58) Field of Classification Search
CPC ........................ G06F 16/24575; G06F 18/2415
USPC ........................................................ 707/772
See application file for complete search history.

(56) References Cited

U.S. PATENT DOCUMENTS

| | | |
|---|---|---|
| 11,347,798 B2 | 5/2022 | Phillips |
| 2012/0191703 A1* | 7/2012 | Huff ..................... G06Q 10/063 707/797 |
| 2019/0155958 A1* | 5/2019 | Lal .......................... G06F 16/953 |
| 2020/0250197 A1* | 8/2020 | Yang .................. G06F 16/24578 |
| 2020/0257707 A1* | 8/2020 | Folkman ................ G06N 20/00 |
| 2020/0394188 A1 | 12/2020 | Roy et al. |
| 2021/0019569 A1 | 1/2021 | Anderson et al. |
| 2021/0073657 A1* | 3/2021 | Neelamegam Vetharaman .......... G06F 16/288 |
| 2021/0224651 A1 | 7/2021 | Crone et al. |
| 2022/0253484 A1 | 8/2022 | Phillips |
| 2023/0023202 A1 | 1/2023 | Bierner et al. |
| 2023/0086791 A1* | 3/2023 | Bierner ............. G06F 16/24575 707/722 |
| 2023/0110941 A1* | 4/2023 | Makhija ................ G06F 40/284 709/224 |
| 2023/0127543 A1* | 4/2023 | Kim ........................ G06F 40/30 704/257 |

(Continued)

*Primary Examiner* — Cam Linh T Nguyen

(74) *Attorney, Agent, or Firm* — Keller Preece PLLC

(57) ABSTRACT

A genealogy online system may cause to display, at a graphical user interface associated with a genealogy online system, a search box, the genealogy online system configured to provide functions comprising family-tree building and historical record search. The genealogy online system may receive a query from a user entered at the search box. The genealogy online system may use a machine learning language model to determine an intent of the user associated with the query. The genealogy online system may cause to display, at the graphical user interface as a result of the query, one or more links to one or more functions of the genealogy online system based on the intent determined by the machine learning language model.

21 Claims, 11 Drawing Sheets

(56) References Cited

U.S. PATENT DOCUMENTS

2023/0161944 A1\* 5/2023 Sharma ................ G06F 40/109
                                                         715/269
2024/0046142 A1\* 2/2024 Marks .................... G06N 3/084

\* cited by examiner

Q Enter your query here...  Search

FIG. 4A

Q go to my DNA matches  Search

FIG. 4B

View my DNA Matches
View others you may be related to.
Click to see the results.

UNIFIED SEARCH SYSTEMS AND METHODS

CROSS-REFERENCE TO RELATED APPLICATION

The present application claims the benefit of U.S. Provisional Patent Application No. 63/418,429, filed on Oct. 21, 2022, which is hereby incorporated by reference in its entirety.

FIELD

The disclosed embodiments relate to methods, systems, and computer-program for performing a unified search in a query engine.

BACKGROUND

A large-scale database such as a genealogy database can include billions of data records. This type of database may allow users to build family trees, research their family history, and make meaningful discoveries about the lives of their ancestors. Users may try to identify relatives with datasets in the database. However, identifying relatives in the sheer amount of data is not a trivial task. Datasets associated with different individuals may not be connected without a proper determination of how the datasets are related. Comparing a large number of datasets without a concrete strategy may also be computationally infeasible because each dataset may also include a large number of data bits. Given an individual dataset and a database with datasets that are potentially related to the individual dataset, it is often challenging to identify a dataset in the database that is associated with the individual dataset.

SUMMARY

Disclosed herein relates to example embodiments that are related to a computer-implemented method, including: causing to display, at a graphical user interface of a genealogy online system, a search box, the genealogy online system configured to provide functions including family-tree building and historical record search; receiving a query from a user entered at the search box; using a language model to determine an intent of the user associated with the query; and causing to display, at the graphical user interface as a result of the query, one or more links to one or more functions of the genealogy online system based on the intent determined by the language model.

In yet another embodiment, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

FIG. 4A is a conceptual diagram of an example unified search box that is displayed at a graphical user interface, in accordance with some embodiments.

FIG. 4B shows a conceptual diagram of a graphical user interface displaying a query of or using a unified search box, in accordance with some embodiments.

FIG. 4C shows a conceptual diagram of a graphical user interface displaying one or more links to one or more functions, in accordance with some embodiments.

FIG. 4J shows a conceptual diagram of a graphical user interface displaying a query of a search box, in accordance with some embodiments.

FIG. 4K shows a conceptual diagram of a graphical user interface displaying one or more links to one or more functions based on the intent determined by a language model, in accordance with some embodiments.

Figure 1:
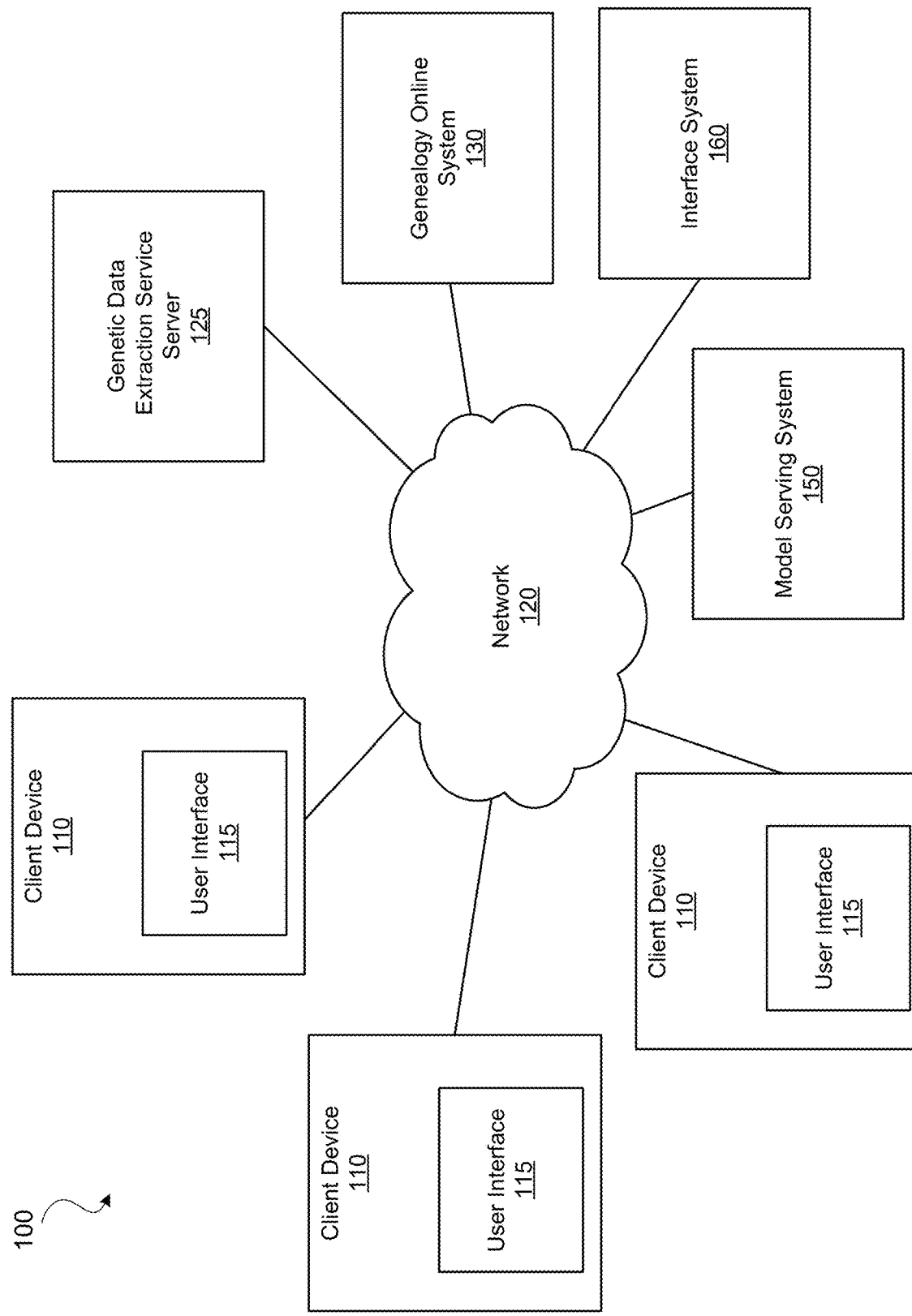
FIG. 1 illustrates a diagram of a system environment of an example computing system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Users are often unsure of how to perform a desired task using the genealogy database, given the high degree of specialization inherent in genetic and genealogical research and associated services and resources. While genealogy databases and associated genealogical research services provide varied utilities, resources, services, and products to facilitate genetic and genealogical research by users, new and even seasoned users of the genealogical research service frequently are at a loss of how to achieve a desired goal using the utilities. For example, record searches must be performed separately and in a different part or component of the genealogical research service from, for example, tree building, DNA matches, and other functions. This can make it difficult for a user, especially a new user, to achieve the emotionally engaging experiences that make genetic and genealogical research a rewarding and worthy pursuit. Such a user may be unsure of how to find out how they are related to a particular person or how to find more information about such a person if they are unsure even of which "stack of needles" in which to search for their desired needle.

Searching on genealogical and genetic research services can be extremely difficult for users given the large differences between and nuances of specific utilities, services, and products that are part of the genealogical and genetic research service. Such services may include record collections in which specific persons (such as ancestors) may be searched for, family tree databases in which a person may be searched, or otherwise. This has made it exceedingly difficult to provide a single search bar that users may utilize for any desired experience or utility on the service.

Existing solutions usually provide multiple options within specific and discrete tools available on the site for searching, each of which must be accessed and utilized independently, and which a user must know about or be directed to, and further which the user must know how to use. By contrast, providing a unified search experience configured to receive a user query, detect therefrom a user's intent using, e.g., a language model or other suitable tool, and then present to the user one or more options (e.g. services or products on the genealogical research service) corresponding to the detected intent advantageously lowers the activation energy for a user to begin using the genealogical research service and having emotionally engaging and rewarding experiences and discoveries thereon.

In some embodiments, a unified search experience allows a user to use a single search bar (e.g., prominently displayed on a banner or central location of the site) for any function of the site, such as a genealogical research service. The systems and methods are configured to use a model, such as a machine learning model, to detect a user's intents and to provide one or more actions according to the detected intents. The actions may include specific searches, such as record searches, with fields of the record search pre-populated with terms from the original search. The actions may also or alternatively include preliminary searching or information identification and retrieval pertinent to the search and/or the user's intent. For example, if a user searches for their parents, as in "lookup my parents," their parents may be automatedly identified from, e.g., a stitched genealogical tree database based on an automated tree-person search using, e.g., the user's own name.

This allows users to more-easily engage with and have rewarding experiences on a site, such as a genealogical research service, without needing to be familiar with the nuances of different search and other functionalities. Rather, a user may search for or request, in an intuitive search bar, a desired datum or action, with the unified search embodiments configured to detect the user's intent and direct the user to the desired datum or action, even with the use of or in cooperation with specialized utilities or resources, such as a record-specific search within a genealogical records database, a tree-person search or action using a stitched genealogical tree database, or otherwise.

A user may enter any search query, such as "go to my dna matches," and the intent thereof is extracted so as to direct the user to an appropriate existing function or activity. An interstitial page may be generated or shown and may suggest that the top option corresponding to the user's search is an action titled "View my DNA Matches." When the user clicks this option, they are automatically navigated to a DNA matches section of the site allowing the user to peruse, view, and/or initiate contact with DNA matches. Alternatively, or additionally, the user may search "view my messages," and be directed to a message center section of the site. Alternatively, or additionally, the user may search "show my hints," and be directed to hints and/or their pedigree. The user may enter a search that is less specific to an existing option, such as "lookup my parents" and be directed to a suitable corresponding function or utility of the site or a link to a different site or utility, as suitable.

In response to a search such as "lookup my parents," the interstitial page may suggest selectable options such as "Search Historic Records for my parent" and "Search my Tree for my parent." In embodiments, the user's parents may be identified in a tree-person search and displayed preliminarily as mother and father in the interstitial page. The user may search just a name, e.g. "John Smith." Options returned may include "Search Historic Records for "John Smith,"" "Search my Tree for "John Smith,"" "Search Ancestry members with the name "John Smith,"" or "Search for Members researching "John Smith."" Further, the user may search "photos of John Smith" and be directed to a pre-populated image-faceted search for first name: John, surname: Smith in an appropriate record-search utility of the genealogical research service, such as an image-faceting search as described in U.S. Patent Application Publication No. 2023/0023202, published Jan. 26, 2023. Users may be directed, based on their search query, to other users with like research interests, e.g. research interests specified and/or otherwise identified from the other users' profiles or behaviors.

For a complex search such as "John Smith born in Texas whose son was Adam Smith" the unified search system and/or method of embodiments may automatically extract entities and relationships from the search query and pre-populate a person search accordingly as one of the options shown in the interstitial page. For example, the pre-populated person search may be a search for first name: John, surname: Smith, birthplace: Texas, child(ren): Adam Smith. A user may then execute said pre-populated search by simply clicking on or otherwise selecting this option as displayed on the interstitial page. In embodiments, the interstitial page presents one or more results from the pre-populated search for the user's review.

The searches need not be personal; for example, a user may simply search "civil war" and be directed to everything available on the site for "Civil War," include a directory of pertinent collections in a record database, research categories, or products and offerings from an armed forces-specific utility, such as Fold3.com, available from Ancestry.com of Lehi, UT.

The interstitial page may include a list of all possible actions to which a user can be directed. This advantageously allows a user to select a desired utility or action from the interstitial page regardless of a directed intent. For example, a user may be directed to an adjacent action, which facilitates coaching or guiding a user toward a most-useful or most-desired resource on the genealogical research service. In embodiments, the list of all possible actions available to a user may be prioritized based on the query and/or the detected intent thereof.

A user's intent(s) may be detected using one or more intent-detection models. The intent-detection model(s) may be a learning model that iteratively improves with user actions, and may include a natural language processing utility for parsing the search query and identifying intents. A catalogue of identified intents matched with corresponding, preexisting actions may be determined and provided such that the user is directed to one or more appropriate actions or resources of the genealogical research service based on extracted, detected intents.

Generic intent may be detected using a first layer of NLP, and a second layer of NLP may be applied to dissect a string to extract entities and relationships. The second layer may be used upon detecting that the search is for a person, and uses or relies upon a suitable machine learning model configured for named-entity recognition or extraction ("NER"), life-event detection, and/or relationship detection, such as the model described in U.S. Pat. No. 11,537,816, granted Dec. 27, 2022, and/or U.S. Patent Application Publication No. 2021/0224651, published Jul. 22, 2021, both of which are hereby incorporated in their entirety by reference. In other embodiments, the second NLP layer is always used to determine whether a person is included in the query, which affects the results of the first layer of NLP.

The first layer of NLP may be performed with a model that includes model(s) for tokenization, part-of-speech detection, etc. and may utilize an off-the-shelf utility such as Apache OpenNLP, available from The Apache Software Foundation of Forest Hill, MD. In embodiments, another model, such as OpenNLP, is applied to every query to detect whether a person is being searched for, in which case the NER model outputs entities and/or relationships therebetween. In response to the detected entities, event, and/or relationships, actions pertaining to person-specific searches are suggested to the user, and in embodiments actions specific to the searched-for person(s) are suggested.

One way to train the models is to associate any links within the interstitial page that users click on or select in response to their search to better learn intents.

In certain embodiments, relationship expressions such as "father's brother's spouse" may be searched, and the model is configured to parse the relationship expression to identify that "father" signifies a specific relationship to the user and is followed by a possessive modifier, and is further followed by another specific relationship to the father, and so on. The other direction may also be performed: "spouse of the brother of my father." Then the person that this refers to is identified and outputted as a suggested search result/action to the user. Various processes described herein may parse these phrases to identify the desired person via a relationship expression. The system may look up the relationship in the user's family tree(s).

As in other embodiments, the identified person may be identified in or using a stitched genealogical tree database, such as that described in U.S. Pat. No. 11,347,798, granted May 31, 2022, U.S. Patent Application Publication No. 2020/0394188, published Dec. 17, 2020, U.S. Patent Application 2022/0253484, published Aug. 11, 2021, each of which is hereby incorporated in its entirety by reference. While certain rule-based embodiments are described, it will be appreciated that identifying a datum representing or corresponding to a particular person from a genealogical database may also be performed using non-rule-based methods as suitable.

A statistical-model embodiment may be used to give probabilities and a predetermined threshold or cutoff may be applied to limit the top-most likely action results to the user.

In some embodiments, if there is sufficiently high confidence regarding a predicted action, the system or method may skip the interstitial page and direct the user straight to the appropriate resource or tool. In some embodiments, record previews may be provided based on a preliminary search using the user's search query. In some embodiments, a call may be made to a particular service, such as a tree service, upon identifying a search query element that suggests a genealogical tree search, such as "parent," to use the user's identifying information to preliminarily identify their parents from their tree or a publicly available tree and suggest the parents' names and other information, including pertinent dates, locations, and/or other biographical details, as suggested search terms on the interstitial page. In embodiments, a set of results from the suggested search may be displayed on the interstitial page such that the user may gauge the desirability and/or likely accuracy of the search and/or search terms. If a person is successfully found in the tree, the system may retrieve any information associated with the person and expand the search based on the information.

In some embodiments, a unified search for a genealogical research service is disclosed. The system may use NLP or other suitable modalities to detect search intent and direct users to preexisting action items within site. Combined use of off-the-shelf NLP and entity-extraction and event- and relationship-detection NLP may also be possible.

Example System Environment

FIG. 1 illustrates a diagram of a system environment 100 of an example genealogy online system 130, in accordance with some embodiments. The system environment 100 shown in FIG. 1 includes one or more client devices 110, a network 120, a genetic data extraction service server 125, and a genealogy online system 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the genealogy online system 130 or any individuals who access the system of the genealogy online system 130, such as an online website or a mobile application. In some embodiments, a client device 110 executes an application that launches a graphical user interface (GUI) for a user of the client device 110 to interact with the genealogy online system 130. The GUI may be an example of a user interface 115. A client device 110 may also execute a web browser application to enable interactions between the client device 110 and the genealogy online system 130 via the network 120. In another embodiment, the user interface 115 may take the form of a software application published by the genealogy online system 130 and installed on the user device 110. In yet another embodiment, a client device 110 interacts with the genealogy online system 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the genealogy online system 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the genealogy online system 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the genealogy online system 130 as the genetic dataset of an individual. SNPs, base pair sequence, genotype, haplotype, RNA sequences, protein sequences, and phenotypes are examples of biomarkers.

The genealogy online system 130 performs various analyses of the genetic data, genealogy data, and users' survey responses to generate results regarding the phenotypes and genealogy of users of genealogy online system 130. Depending on the embodiments, the genealogy online system 130 may also be referred to as an online server, a computing server, a personal genetic service server, a genealogy server, a family-tree building server, and/or a social networking system. The genealogy online system 130 receives genetic data from the genetic data extraction service server 125 and stores the genetic data in the data store of the genealogy online system 130. The genealogy online system 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The genealogy online system 130 may present or cause the user interface 115 to present the results to the users through a GUI displayed at the client device 110. The results may include graphical elements, textual information, data, charts, and other elements such as family trees.

In some embodiments, the genealogy online system 130 also allows various users to create one or more genealogical profiles of the user. The genealogical profile may include a list of individuals (e.g., ancestors, relatives, friends, and other people of interest) who are added or selected by the user or suggested by the genealogy online system 130 based on the genealogical records and/or genetic records. The user interface 115 controlled by or in communication with the genealogy online system 130 may display the individuals in a list or as a family tree such as in the form of a pedigree chart. In some embodiments, subject to user's privacy setting and authorization, the genealogy online system 130 may allow information generated from the user's genetic dataset to be linked to the user profile and to one or more of the family trees. The users may also authorize the genealogy online system 130 to analyze their genetic dataset and allow their profiles to be discovered by other users.

In some embodiments, the genealogy online system 130 may use one or more language machine learning models for performing various tasks related to analyzing data in the genealogy online system 130 and interacting with users of the genealogy online system 130. The language machine learning models may be referred simply to as language models, natural language processing models, or large language models (LLMs). The genealogy online system 130 may use language models that are trained by the genealogy online system 130 and may also utilize other pre-trained language models that are provided by third-party artificial intelligence providers. In embodiments pre-trained language models provided by third-party artificial intelligence providers are fine-tuned by or on data corresponding to the genealogy online system 130 The language model functions may be provided by the model serving system 150 and the interface system.

In some embodiments, language models used by the genealogy online system 130 to analyze genealogical data are LLMs that are trained on a large corpus of training data to generate outputs for the NLP tasks. An LLM may be trained on massive amounts of text data, often involving billions of words or text units. The large amount of training data from various data sources allows the LLM to generate outputs for many inference tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units (GPUs) for training or deploying deep neural network models. In one instance, the LLM may be trained and hosted on a cloud infrastructure service. The LLM may be trained by the genealogy online system 130 or entities/systems different from the genealogy online system 130. An LLM may be trained on a large amount of data from various data sources. For example, the data sources include websites, articles, posts on the web, and the like. From this massive amount of data coupled with the computing power of LLMs, the LLM is able to perform various inference tasks and synthesize and formulate output responses based on information extracted from the training data.

The model serving system 150 receives requests from the genealogy online system 130 to perform inference tasks using machine-learned models, such as through an API call from the genealogy online system 130 to the model serving system 150. The inference tasks include, but are not limited to, natural language processing (NLP) tasks, audio processing tasks, image processing tasks, video processing tasks, and the like. In some embodiments, the machine-learned models deployed by the model serving system 150 are models configured to perform one or more NLP tasks. The NLP tasks include, but are not limited to, text generation, query processing, machine translation, chatbot applications, and the like. In some embodiments, the language model is configured as a transformer neural network architecture. Specifically, the transformer model is coupled to receive sequential data tokenized into a sequence of input tokens and generates a sequence of output tokens depending on the inference task to be performed.

The model serving system 150 receives a request including input data (e.g., text data, audio data, image data, family tree data, genealogic data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In some embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like. The LLM is configured to receive a prompt and generate a response to the prompt. The prompt may include a task request and additional contextual information that is useful for responding to the query. The LLM infers the response to the query from the knowledge that the LLM was trained on and/or from the contextual information included in the prompt.

In some embodiments, the inference task for the model serving system 150 can primarily be based on reasoning and summarization of knowledge specific to the genealogy online system 130, rather than relying on general knowledge encoded in the weights of the machine-learned model of the model serving system 150. Thus, one type of inference task may be to perform various types of queries on large amounts of data in an external corpus in conjunction with the machine-learned model of the model serving system 150. For example, the inference task may be to perform question-answering, text summarization, text generation, and the like based on information contained in the external corpus.

In one embodiment, the genealogy online system 130 is connected to an interface system 160. The interface system 160 receives domain-specific data from the genealogy online system 130 and builds a structured index over the domain-specific data using, for example, another machine-learned language model or heuristics. The domain-specific data may be data that is specifically provided by the genealogy online system 130 and that pertains to the knowledge of the genealogy online system 130. The domain-specific data may be used to fine tune a language model provided by the model serving system 150. Note that domain here is not limited to webpage domain. Domain may refer to an environment in which a system operates and/or an environment for a group of units and individuals to use common domain knowledge to organize activities, information, and entities related to the domain in a specific way. The interface system 160 receives one or more queries from the genealogy online system 130 on the domain-specific data. The interface system 160 constructs one or more prompts for input to the model serving system 150. A prompt may include the query of the user and context obtained from the structured index of the domain-specific data. In one instance, the context in the prompt includes portions of the structured indices as contextual information for the query. The interface system 160 obtains one or more responses from the model serving system 150 and synthesizes a response to the query on the domain-specific data. While the genealogy online system 130 can generate a prompt using the domain-specific data as context, oftentimes the amount of information in the domain-specific data exceeds prompt size limitations configured by the machine-learned language model. The interface system 160 can resolve prompt-size limitations by generating a structured index of the data and offering data connectors to domain-specific data sources.

In some embodiments, the genealogy online system 130 performs a query that is directed to knowledge that is related to genealogy online system 130. The genealogy online system 130 provides domain-specific data to the interface system 160. The genealogy online system 130 provides a query to the interface system 160. The genealogy online system 130 receives a response to the prompt from the interface system 160 based on execution of the language model in the model serving system 150 using prompts generated by the interface system 160. The genealogy online system 130 obtains the response and may act in accordance with the response or may route the response to the end user.

In some embodiments, the model serving system 150 and/or the interface system 160 may be managed by a separate entity from the genealogy online system 130. In some embodiments, the model serving system 150 and/or the interface system 160 may be managed and deployed by the entity managing the genealogy online system 130.

Example Computing Server Architecture

Figure 2:
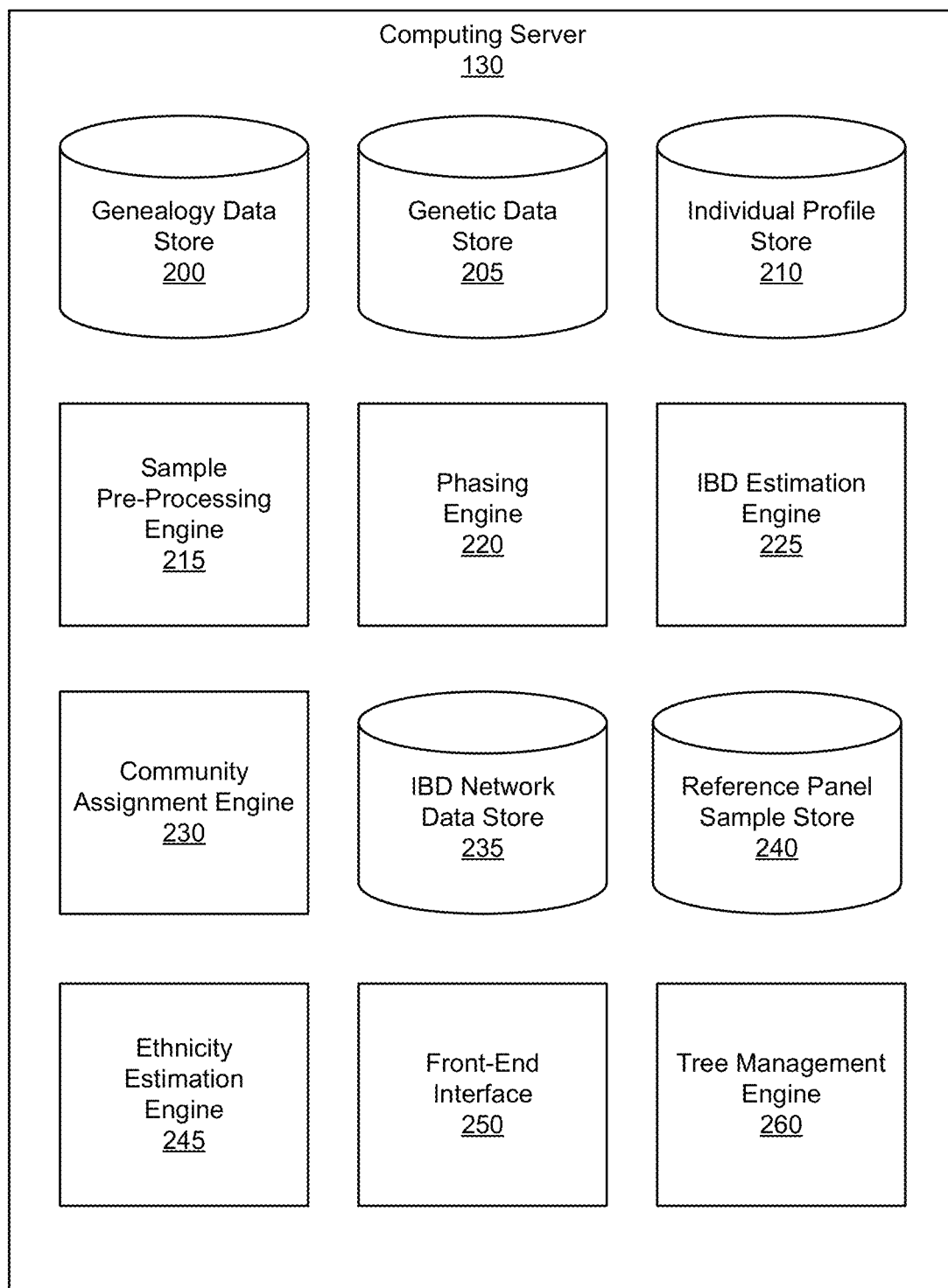
FIG. 2 is a block diagram of an architecture of an example computing system, in accordance with some embodiments.

FIG. 2 is a block diagram of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 250, and a tree management engine 260. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP sites (e.g., allele sites) filtered from the sequencing results. A SNP site that is single base pair long may also be referred to a SNP locus. A SNP site may be associated with a unique identifier. The genetic dataset may be in a form of diploid data that includes a sequencing of genotypes, such as genotypes at the target SNP site, or the whole base pair sequence that includes genotypes at known SNP site and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g., stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and research conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

In some embodiments, the individual profile store 210 may be a large-scale data store. In some embodiments, the individual profile store 210 may include at least 10,000 data records in the form of user profiles and each user profile may be associated with one or more genetic datasets and one or more genealogical data entries. In some embodiments, the individual profile store 210 may include at least 50,000 data records in the form of user profiles and each user profile may be associated with one or more genetic datasets and one or more genealogical data entries. In some embodiments, the individual profile store 210 may include at least 100,000 data records in the form of user profiles and each user profile may be associated with one or more genetic datasets and one or more genealogical data entries. In some embodiments, the individual profile store 210 may include at least 500,000 data records in the form of user profiles and each user profile may be associated with one or more genetic datasets and one or more genealogical data entries. In some embodiments, the individual profile store 210 may include at least 1,000,000 data records in the form of user profiles and each user profile may be associated with one or more genetic datasets and one or more genealogical data entries. In some embodiments, the individual profile store 210 may include at least 2,000,000 data records in the form of user profiles and each user profile may be associated with one or more genetic datasets and one or more genealogical data entries. In some embodiments, the individual profile store 210 may include at least 5,000,000 data records in the form of user profiles and each user profile may be associated with one or more genetic datasets and one or more genealogical data entries. In some embodiments, the individual profile store 210 may include at least 10,000,000 data records in the form of user profiles and each user profile may be associated with one or more genetic datasets and one or more genealogical data entries.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

A phasing algorithm may also generate phasing result that has a long genomic distance accuracy and cross-chromosome accuracy in terms of haplotype separation. For example, in some embodiments, an IBD-phasing algorithm may be used, which is described in further detail in U.S. Patent Application Publication No. US 2021/0034647, entitled "Clustering of Matched Segments to Determine Linkage of Dataset in a Database," published on Feb. 4, 2021. For example, the computing server 130 may receive a target individual genotype dataset and a plurality of additional individual genotype datasets that include haplotypes of additional individuals. For example, the additional individuals may be reference panels or individuals who are linked (e.g., in a family tree) to the target individual. The computing server 130 may generate a plurality of sub-cluster pairs of first parental groups and second parental groups. Each sub-cluster pair may be in a window. The window may correspond to a genomic segment and has a similar concept of window used in the ethnicity estimation engine 245 and the rest of the disclosure related to HMMs, but how windows are precisely divided and defined may be the same or different in the phasing engine 220 and in an HMM. Each sub-cluster pair may correspond to a genetic locus. In some embodiments, each sub-cluster pair may have a first parental group that includes a first set of matched haplotype segments selected from the plurality of additional individual datasets and a second parental group that includes a second set of matched haplotype segments selected from the plurality of additional individual datasets. The computing server 130 may generate a super-cluster of a parental side by linking the first parental groups and the second parental groups across a plurality of genetic loci (across a plurality of sub-cluster pairs). Generating the super-cluster of the parental side may include generating a candidate parental side assignment of parental groups across a set of sub-cluster pairs that represent a set of genetic loci in the plurality of genetic loci. The computing server 130 may determine a number of common additional individual genotype datasets that are classified in the candidate parental side assignment. The computing server 130 may determine the candidate parental side assignment to be part of the super-cluster based on the number of common additional individual genotype datasets. Any suitable algorithms may be used to generate the super-cluster, such as a heuristic scoring approach, a bipartite graph approach, or another suitable approach. The computing server 130 may generate a haplotype phasing of the target individual from the super-cluster of the parental side.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020 and U.S. Pat. No. 10,692,587, granted on Jun. 23, 2020, entitled "Global Ancestry Determination System" describe different example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine learning models or other heuristic algorithms. For example, the tree management engine 260 may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees.

Example Unified Search Process

Figure 3:
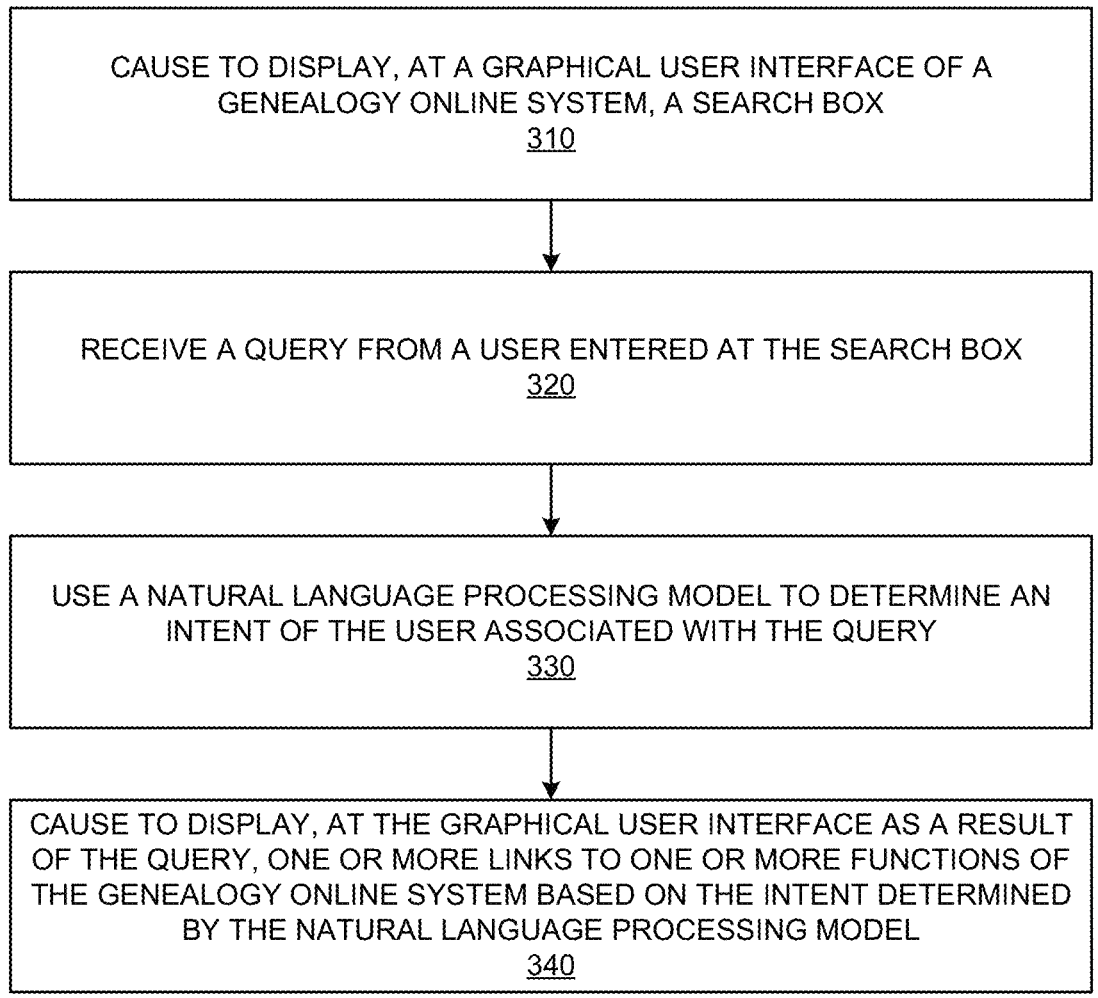
FIG. 3 is a flowchart depicting an example process for performing a unified search, in accordance with some embodiments.

FIG. 3 is a flowchart depicting an example process 300 for performing a unified search, in accordance with some embodiments. The process 300 may be performed by a computing device, such as a genealogy online system 130. The process 300 may be embodied as a software algorithm that may be stored as computer instructions that are executable by one or more processors. The instructions, when executed by the processors, cause the processors to perform various steps in the process 300. In various embodiments, one or more steps in the process 300 may be added, removed, or changed. Also, in various embodiments, the steps in process 300 do not necessarily need to follow the order as presented in FIG. 3. While the genealogy online system 130 is used as the primary example for the unified search system, the unified search system may be applied to other online systems that provide various functionalities that may or may not be related to genealogy or genetic data analysis.

The genealogy online system 130 may cause 310 to display, at a graphical user interface, a search box. The search box may be located on a landing page of the genealogy online system, such as the front page of the genealogy online system. The genealogy online system 130 may provide various functions such as family-tree building, historical record search, genetic information such as DNA information, ancestry and community research, a family tree viewer, a genealogical record research interface, inter-user messaging, a user profile setting, and a genetic data analysis tool, and other functionalities that are described in further detail in FIG. 2. In some embodiments, the genealogy online system 130 may provide query pages of, e.g., different record collections. A record collection may include many records, such as marriage records, death records, census records, court records, probate records, adoption records, obituary records, etc. A query page allows users to query records in one or more record collections selected to be included in the query page. Some of the record collections include historical records that are digitized as a digital collection of historical records.

In some embodiments, there are different query pages and pages for various different functionalities provided by the genealogical research service, which may be a genealogy online system 130, which terms may be used herein interchangeably. Examples of some of the functionalities are described in various engines in FIG. 2. The various query pages and functionalities may be associated with different webpage domains (including subdomains or other affiliated webpage domains) of the genealogy online system 130. For example, a first record collection may have a first specific query page, while a second record collection may have a second specific query page. In addition, family-tree building, inter-user messaging, and genetic information may also each have its own specific page. The search box provided by the genealogy online system 130 may be a unified search box that allows the user to enter a query for a plurality of or all or substantially all of the different functionalities of the genealogy online system 130, rather than being limited to a search for a specific, discrete functionality. The unified search box may be associated with a webpage domain that is different from other domains of various functionalities provided by the genealogy online system 130. The genealogy online system 130 analyzes the query and recommends appropriate functionalities and/or results to the user based on the query, and in embodiments navigates the user to the appropriate functionalities based on an intent detected from the query. The analysis may be performed by any models and engines trained and maintained by or in cooperation with the genealogy online system 130. The analysis may also be performed using the model serving system 150 and the interface system 160. FIG. 4A is a conceptual diagram of an example unified search box that is displayed at a graphical user interface, in accordance with some embodiments.

The genealogy online system 130 may receive 320 a query from a user entered at the search box. In some embodiments, the query may be in natural language. The query can be an action, whether specified in a manner specific to the genealogical research service or specified in broad, generic terms, a named entity such as a person's name, personal information, a record collection, a command, a sentence, a question, or any suitable combination. For example, an action may be associated with one or more functionalities provided by the genealogy online system 130. A user may enter actions such as "go to my tree," "go to messages," "account settings," "profile," "billing," etc. A named entity may be a natural person, such as "John Smith," "my father," "my cousins," and other named entities such as a geographical location, a cemetery name, a school, an organization, etc. The query may also contain personal information. For example, a user may enter "my father John Smith" or simply "John Smith."

The genealogy online system 130 may check whether the query "John Smith" is related to the user's personal information, automatically recognize "John Smith" may be the father of the user Joe Smith, and provide recommendations differently from another natural person's name entered in the query; in other words, the recommendations provided to the user may be specific to the detected relative John Smith. In some embodiments, a user may also ask for a record collection in the query. For example, a user may type in "1950 census record." In some embodiments, the query may also be a command, a sentence, or a question, such as "add John Smith to my family tree in the Smith family branch," "what is the shared DNA length between me and John Smith?" and/or "make a new tree." Below Tables 1 and 2 provide additional examples of what a user may enter in a query. Those are merely examples of queries that a user may enter. In some embodiments, as discussed in further detail below, the genealogy online system 130 may use one or more deep learning language models (e.g., any models trained by the genealogy online system 130 and/or provided by the model serving system 150 such as large language models) to analyze the query and the possibilities of the query are virtually unlimited.

The genealogy online system 130 may use 330 a language model such as a natural language processing model to determine the intent of the user associated with the query. The determined intent allows the genealogy online system 130 to provide recommendations on the functions to be presented to the user based on the query. The functions to be presented can take various forms. For example, the recommended function to be presented may be a link to a functional platform (e.g., tree builder, record search query page, DNA results page). The recommended function may also be direct information or search results presented as a result of the query. In some embodiments, depending on the query, the genealogy online system 130 may provide a link to a direct record. In other situations, the genealogy online system 130 may provide a link to a query page of a record collection, instead of giving a direct record. In response to a tree-person query, the genealogy online system 130 may provide a link to a tree-person profile. In response to a DNA-matches query, the genealogy online system 130 may provide a link to one or more DNA matches' profiles or prepopulate a message to a DNA match, for example.

Table 1 below is a list of example query and intent pairs that may be used by the genealogy online system 130. It will be appreciated that the below examples are merely exemplary, and that any suitable permutation or alternative query and/or intent may be utilized as suitable. The below examples may be utilized in a heuristic or rules-based approach or may be exemplary of a machine-learned approach.

TABLE 1

| Query | Detected Intent |
|---|---|
| [country name] collections | collection search |
| search for member | member search |
| go to my tree | view tree |
| my hints | view hints |
| search research interests | search research interests |
| search records | navigate to record search |
| go to chat | navigate to messages |
| account settings | navigate to account settings |
| profile | navigate to account profile |
| cancel membership | navigate to account settings |
| what is my grandmother's maiden name? | fact search |
| what are my grandparent's siblings? | tree lookup |

In some embodiments, a language model may be used to determine the intent of the user based on the query. The language model may take various suitable forms. For example, in some embodiments, the language model may be a rules-based model that is based on query and intent pairs that are illustrated in Table 2. In some embodiments, the language model may be a heuristic model. In some embodiments, the language model may include a deep language model or a large language model that is trained to receive the query as an input and output one or more actions that are available for the genealogy online system 130. In some embodiments, the language model may include various components such as the rule-based component, the heuristic component, and the deep learning model. In some embodiments, the genealogy online system 130 may use a rules-based model first and collect training samples as the unified search box continues to operate. The genealogy online system 130 may transition into a deep learning model or, e.g., a fine-tuned large language model, after sufficient training samples are collected to train the model.

By way of example, the genealogy online system 130 may use a combination of rules, heuristics, and machine learning language model to determine the user intent. For example, the genealogy online system 130 may maintain a table that maps certain keywords to one or more heuristics or machine learning language model or maps certain keywords to certain functionalities of the genealogy online system 130. In some embodiments, the genealogy online system 130 may also input the query input by the user to a machine learning model which may be trained to output one or more pre-defined categories of intents to which the query belongs. For example, the genealogy online system 130 may pre-define a list of categories and the language model is trained to classify any natural language input query to one or more categories. An example of a pre-defined list of intents is illustrated in Table 1. The language model may be a neural network that has fully connected layers towards the output side for classification purposes. These are merely examples of various models and ways how the user intent may be determined. In some embodiments, the genealogy online system 130 may also rely on an LLM to determine the intent of the user.

In some embodiments, the genealogy online system 130 may also maintain an intent-action table that maintains the action that should be carried out by the genealogy online system 130 after an intent is determined. In some embodiments, the action may be nested. For example, based on the input query provided by the user, the genealogy online system 130 may determine an intent and an action. The action may include two or more parts. For example, the first part may be a launch of a functionality of the genealogy online system 130 as indicated by the Table 2. The second part may be a query, such as a structured query (e.g., SQL query), that is translated by the input query of the user using another set of rules, heuristics, and/or language models. As such, the genealogy online system 130 may carry out the first part of the action by launching a functionality of the genealogy online system 130 and automatically use the query to generate result provided by the functionality.

TABLE 2

| Query Examples | Intent | Action |
|---|---|---|
| make a new tree | Create a tree | Go to tree creation page |
| Buy a test | Buy a DNA test | Go to buy DNA test page |
| my profile | Navigate to profile | Go to account profile |
| Show me my hints | Navigate to Hints | Go to hints page for most recently viewed tree |
| Take me to my DNA page | Navigate to DNA | Go to DNA landing page |
| Where is my tree? | Navigate to Tree | Go to most recently viewed tree |
| Show my matches | Navigate to DNA matches | Go to DNA matches page |
| Post to message board | Navigate to message boards | Go to message boards |
| Settings | Navigate to account settings | Go to account settings |
| Help! | Find help | Go to support center |
| I have a question | | Search support center for specific question |
| Help me upgrade my account | | |
| 1860 united states federal census | Find specific collections | Go to collection page |
| NYS death index | | |
| how to find old obituaries in Illinois | | |
| marriage records in south africa | | |
| Joe Biden family | Learn about a famous person | Custom page |
| Jesse James lineage | | |
| Smith | Research a surname | Go to specific name-origin page |
| Where does the name Smith come from? | | |

TABLE 2-continued

| Query Examples | Intent | Action |
|---|---|---|
| John Smith's birth information | Find life event facts | Record search populated from customer query |
| How did my grandfather die? | | Record search restricted to specific category, collection, or facet |
| | | Restrict to records containing relevant field |
| What was my grandmother's maiden name? | | Automatically perform search and extract information for customer |
| What did my grandmother look like? | Search for photos | Record search restricted to person image facet |

The genealogy online system 130 may cause 340 to display, at the graphical user interface as a result of the query, one or more links to one or more functions or resources of the genealogy online system 130 based on the intent determined or detected by the language model. The recommendations provided by the genealogy online system 130 may vary based on the exact query and the determined intent predicted by the genealogy online system 130. Alternatively, or additionally, the genealogy online system 130 may cause to display at the user interface and as a result of the query one or more results, including records, tree person profiles, DNA matches, messages, or other results that might be obtained using a downstream utility of the genealogy online system 130.

It will be appreciated that a query may be ambiguous and may match more than one intent. The genealogy online system 130 in embodiments is configured to choose one, some, or all of the plausible results for the query to generate user actions. The plausible results may be determined based on model probabilities, heuristics, or other suitable approaches. For example, a user query "my uncle John" could match intents such as 1) view the user's uncle in their family tree (action=go to tree), 2) find information about that person (action=generate a record search specific to the user's uncle as determined from the user's information, the name John, and the relationship between the two persons), 3) look up this person in DNA matches (action=go to John's dna page or profile), and/or any other suitable action.

It will also be appreciated that the online genealogy system 130 or associated facilities or components may be "self-training" in that the data from user queries, intents extracted or determined therefrom, and/or user interactions with the recommendations, links, and/or results provided by the genealogy online system 130 in response to the determined intents may be used to further train, e.g. fine tune, one or more ML models or to adjust heuristics associated with the intent-detection modalities discussed herein. This advantageously allows the system to improve with continued usage, honing the accurate determination of intents from users and providing engaging links, results, and experiences in response to a convenient and intuitive unified search experience.

Figure 4D:
FIG. 4D shows a conceptual diagram of a graphical user interface displaying a query of or using a unified search box, in accordance with some embodiments.

FIG. 4B through FIG. 4M illustrate various examples of queries entered into the unified search box of FIG. 4A and recommendations provided by the genealogy online system 130 in response thereto. FIG. 4B shows a conceptual diagram of a graphical user interface displaying a query of or using a unified search box, in accordance with some embodiments. A user enters a query of "go to my DNA matches." FIG. 4C shows a conceptual diagram of a graphical user interface displaying one or more links to one or more functions of the genealogy online system 130 based on the intent determined by the language model, in accordance with some embodiments. In the particular example shown in FIG. 4C, the intent is determined based on the query "go to my DNA matches." The query result displays a link to one of the functionalities provided by genealogy online system 130 that allows users to review IBD matches. FIG. 4C shows an interstitial page in which the one or more links or results in response to the query are displayed in the graphical user interface; in other embodiments, the genealogy online system 130 causes the user to be navigated directly to the links or results, e.g. the appropriate downstream application or document, without an interstitial page.

Figure 4E:
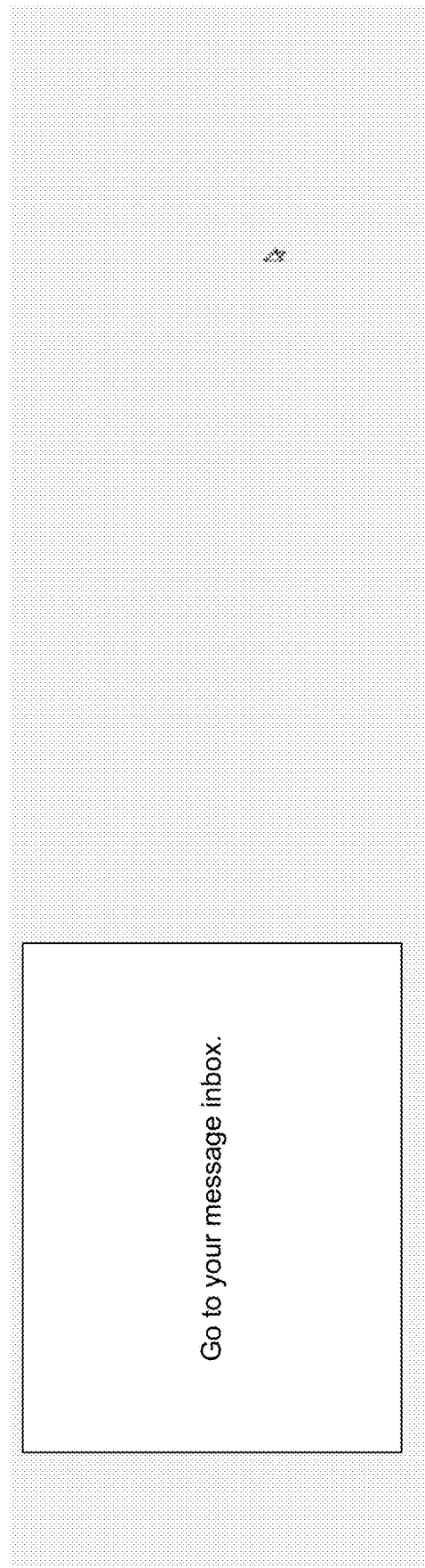
FIG. 4E shows a conceptual diagram of a graphical user interface displaying one or more links to one or more functions based on the intent determined by a language model, in accordance with some embodiments.

FIG. 4D shows a conceptual diagram of a graphical user interface displaying a query of or using a unified search box, in accordance with some embodiments. A user enters a query of "view my messages." FIG. 4E shows a conceptual diagram of a graphical user interface displaying one or more links in an interstitial page to one or more functions of the genealogy online system 130 based on the intent determined by the language model, in accordance with some embodiments. In the particular example shown in FIG. 4E, the intent is determined based on the query "view my messages." The query result displays a link to one of the functionalities provided by genealogy online system 130 that launches the messaging center of the genealogy online system 130.

Figure 4F:
FIG. 4F shows a conceptual diagram of a graphical user interface displaying a query of or using a unified search box, in accordance with some embodiments.
Figure 4G:
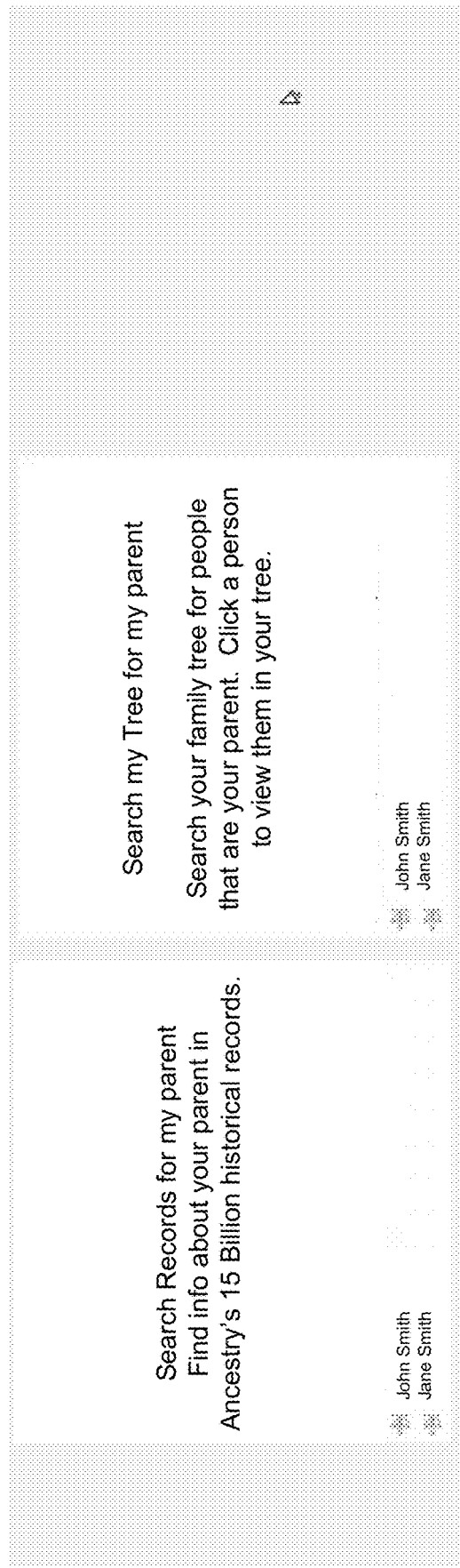
FIG. 4G shows a conceptual diagram of a graphical user interface displaying one or more links to one or more functions based on the intent determined by the language model, in accordance with some embodiments.

FIG. 4F shows a conceptual diagram of a graphical user interface displaying a query of or using a unified search box, in accordance with some embodiments. A user enters a query of "lookup my parents." FIG. 4G shows a conceptual diagram of a graphical user interface displaying one or more links in an interstitial page to one or more functions of the genealogy online system 130 based on the intent determined by the language model, in accordance with some embodiments. In the particular example shown in FIG. 4G, the intent is determined based on the query "lookup my parents." The language model recognizes that personal information is involved in the query and provides personally tailored recommendations as the query result, e.g. a link to a record search for the user's parents, or a tree-person search within a family tree. The displayed links may include a determined name or names of the user's parents based on the detected intent. For instance, the genealogy online system 130 may determine that the intent is to retrieve information regarding the user's parents and perform a preliminary stitched genealogical tree search using the user's details, such as the user's name, birth date, or other details to ascertain who the user's parents are, with top preliminary results obtaining from the stitched genealogical tree search presented to the user.

Intent detection may be performed, as discussed above, by using a first modality, such as an NLP model like OpenNLP, to detect that a person is included in the query, and then using a second modality, such as an NLP model configured for entity extraction or event- or relationship-recognition, to determine data regarding the involved persons. In addition, the language model identifies two functions that are applicable to the query. The query result displays links to two functionalities provided by genealogy online system 130. The first link directs the user to a query page for a search of historic records for the user's parents. The second link allows the user to enter a platform that searches family trees for the user's parents. In embodiments, intent detection is performed by a suitable large language model.

Figures 4H, 4I:
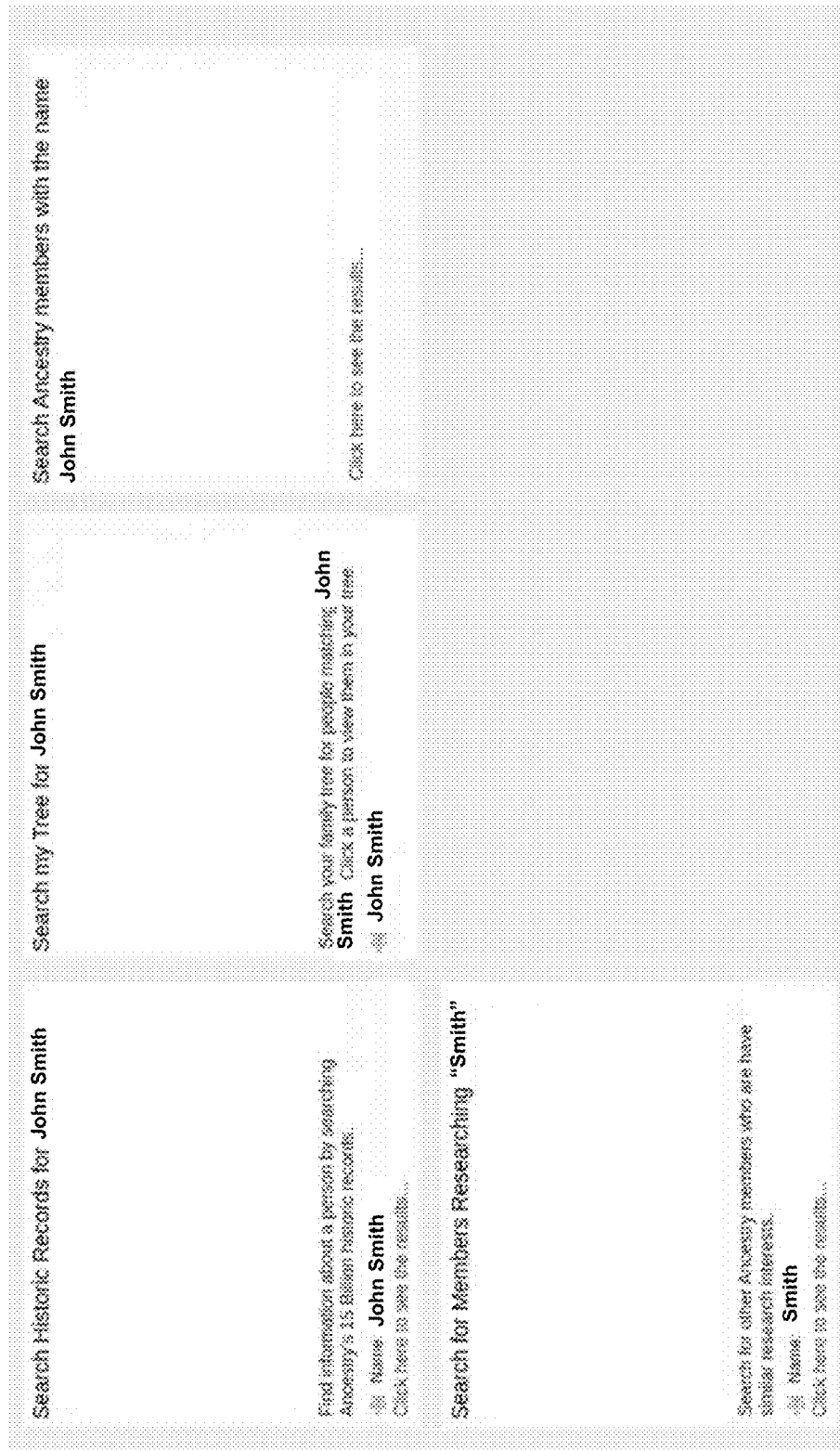
FIG. 4H shows a conceptual diagram of a graphical user interface displaying a query of or using a unified search box, in accordance with some embodiments.
FIG. 4I shows a conceptual diagram of a graphical user interface displaying one or more links to one or more functions based on the intent determined by a language model, in accordance with some embodiments.

FIG. 4H shows a conceptual diagram of a graphical user interface displaying a query of or using a unified search box, in accordance with some embodiments. A user enters a query of "John Smith." FIG. 4I shows a conceptual diagram of a graphical user interface displaying one or more links in an interstitial page to one or more functions of the genealogy online system 130 based on the intent determined by the language model, in accordance with some embodiments. In the particular example shown in FIG. 4I the intent is determined based on the query "John Smith." The language model recognizes that a natural person's name is included.

The language model or other modality identifies four functions that are applicable to the query. The query result displays links to four functions provided by genealogy online system 130. The first link directs the user to a query page for a search of historic records for the natural person. The second link allows the user to enter a platform that searches family trees for the natural person. The third link is another query page for the search of individual profiles in the genealogy online system 130. The fourth link allows the user to search for other users who have similar research interests.

While the four functions above are described, it will be appreciated that any suitable number and type of functions are contemplated. In embodiments, plausible functions are assessed against the query and/or the detected intent and a preliminary ranking of the plausible functions is performed, with a most-confident function presented in a primary location, such as the top-left location of FIG. 4I, with subsequent functions presented in order of decreasing confidence. While a grid or matrix view of four or more options is shown, it will be appreciated that the depicted arrangement is merely exemplary and any suitable arrangement of links, results, or otherwise is contemplated as part of the present disclosure.

FIG. 4J shows a conceptual diagram of a graphical user interface displaying a query of a search box, in accordance with some embodiments. A user enters a query of "John Smith born in Texas in 1946." FIG. 4K shows a conceptual diagram of a graphical user interface displaying in an interstitial one or more links to one or more functions of the genealogy online system 130 based on the intent determined by the language model, in accordance with some embodiments. In the particular example shown in FIG. 4K the intent is determined based on the query "John Smith born in Texas in 1946."

Compared to the result shown in FIG. 4I, since more information is provided in the query, the language model may determine with sufficient confidence that the user's intent is to search for a specific record of a particular natural person as opposed to other plausible functions. In turn, the language model causes the graphical user interface to directly display a record search result or set of results for people that fit the criteria specified in the query.

Thus, in embodiments, the interstitial page may be skipped entirely when intent is detected with sufficiently high confidence, and the user is directed straight to the appropriate resource or functionality of the genealogical research service. It will be appreciated that while embodiments showing an interstitial page comprising one or more links to other destinations of the genealogical research service are shown, and embodiments showing a user being navigated directly to a resource or destination of the genealogical research service based on a high-confidence intent prediction are shown, in embodiments the interstitial page may include links to destinations of the genealogical research service as well as results from the destinations themselves.

That is, below the links to the destinations, one or more results that would be obtained from the suggested destination or function and using the query and/or features extracted therefrom may be shown. This may include a predetermined number of results to be displayed to the user in a preliminary fashion. In embodiments, instead of links to other destinations or resources, the results from the suggested resources or destinations, such as a person-specific historical records search using entities and other details extracted from the query, may be presented in the interstitial page. Where a plurality of possible destinations or resources are detected for a query, the results from one, some, or all of the possible destinations may be shown together or otherwise as suitable using the interstitial page.

While links to particular functions below which preliminary results from said functions presented therebelow has been described, it will be appreciated that any suitable arrangement of links and results is contemplated in the embodiments of the present disclosure. For example, a carousel of preliminary results through which the user may swipe or click (and in embodiments in which results content that matches components of the query are highlighted or otherwise called out) may be presented with links to plausible functions shown adjacent thereto.

Figure 4L:
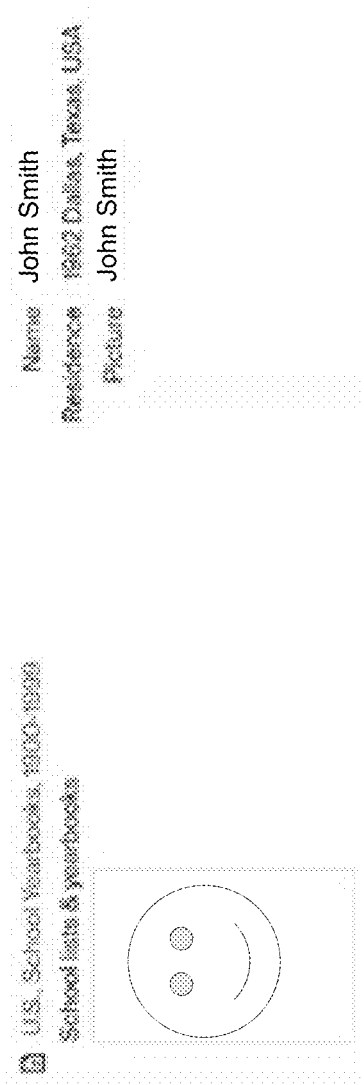
FIG. 4L shows a conceptual diagram of a graphical user interface displaying a query of a search box, in accordance with some embodiments.
Figure 4M:
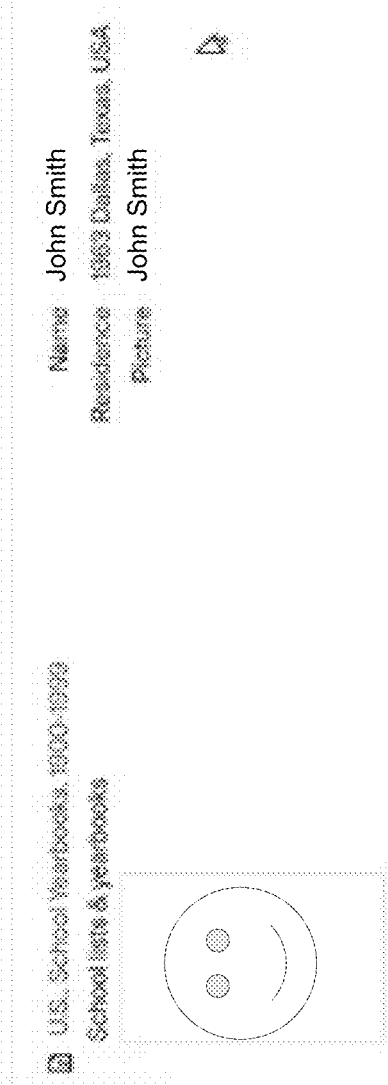
FIG. 4M shows a conceptual diagram of a graphical user interface displaying one or more links to one or more functions based on the intent determined by a language model, in accordance with some embodiments.

FIG. 4L shows a conceptual diagram of a graphical user interface displaying a query of a search box, in accordance with some embodiments. A user enters a query of "photos for John Smith." FIG. 4M shows a conceptual diagram of a graphical user interface displaying in an interstitial page one or more links to one or more functions of the genealogy online system 130 based on the intent determined by the language model, in accordance with some embodiments. In the particular example shown in FIG. 4M the intent is determined based on the query "photos for John Smith." Since specific information is provided in the query, the language model may determine with sufficient confidence that the user's intent is to search for photos of a particular person as opposed to other plausible functions. In turn, the language model causes the graphical user interface to directly display a search result that includes photos of natural persons that may fit the criteria.

Such results may be an image-faceted search using components of the unified-search query. In other embodiments, the unified search system and method embodiments may perform a preliminary tree-person search of entities extracted from the unified-search query and/or user details and using, e.g., a stitched genealogical-tree database. Additional pertinent details may be gleaned therefrom, such as residences places and dates (such as, in the example of FIG. 4M, Dallas, TX, USA in 1962) that correspond to a most-likely tree-person, allowing the system and/or methods of embodiments to augment a user's query with additional pertinent details that better facilitate an engaging and rewarding experience with the online genealogy system 130.

Example Machine Learning Models

In various embodiments, a wide variety of machine learning techniques may be used for the language model, whether it is a machine learning model maintained internally by the genealogy online system 130 or by the model serving system 150. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), generative pre-trained transformer (GPT), large language model (LLM) may also be used. For example, various deep learning techniques may be used to convert the query in natural language to embedding vectors and to determine the intents of the user based on the query.

The genealogy online system 130 may generate embedding vectors representing the query that is presented in words. Each embedding vector may represent the semantic characteristics of a query or a word in the query. In some embodiments, the words of the textual content are mapped into vectors using different embedding techniques such as term frequency-inverse document frequency (TF-IDF) vectorization, continuous big-of-words (CBOW) model, and/or skip-gram model. The mapping process may be conducted through a supervised or unsupervised neural network. The generation of the word vectors is based on aggregated word-to-word co-occurrence statistics from a corpus. A corpus may be selected from a collection of open-source data sources, a collection of textual content of the survey responses stored in genealogy online system 130 and may additionally include other sources of text from books, publications, online articles, advertisements, etc. to provide additional training to a neural network that performs the word vector generation. Each word vector generated corresponds to a word and represents the semantic correlation, similarity, and difference of the word with respect to other words in the corpus. Techniques such as TF-IDF vectorization may be used to penalize the weight of common words such as articles, prepositions, and conjunctions that carry little significance in defining semantic characteristics of a text.

The generation of embedding vectors for queries can be achieved in different ways. In one embodiment, after the words of a query are converted into word vectors, an average of all of the word vectors can be calculated to generate a common vector that has a specific direction and magnitude. The average can be a simple average or a weighted average. For example, the weighted average can be calculated based on the number of occurrences of a word in the query. Techniques such as TF-IDF vectorization may be used to reduce the weight of common words that do not carry much semantic significance. The averaged vector represents an overall semantic characteristic of the textual content of the query in the form of a mathematical vector. Such averaged vector is served as the embedding of the query. In another case, instead of taking the average of all word vectors of query, each word in the query may be generated as embedding vectors and sequence analysis techniques may be used to understand the query as a whole.

In some embodiments, the generation of embeddings for queries may be carried out through a neural network. The neural network can be a deep neural network that includes an input layer, an output layer, and one or more hidden intermediate layers. Each layer includes one or more nodes that are connected to other layers. A layer receives inputs from a preceding layer and produces outputs for a succeeding layer. In one case earlier layers (e.g., layers closer to the input layer) are configured to capture syntactic meanings of the textual content, while later layers (e.g., layers closer to the output layer) are configured to capture semantic meanings of the textual content. The layers of the neural network perform recognition of syntactic and/or semantic features by convolution, clustering, classification, matching, and/or the like. The neural network is configured to receive the textual content of the query or the word vectors of the query as an input. The neural network is configured to output a vector that represents the semantic characteristic of the textual content of an item after the input is analyzed through multiple layers and nodes. The output vector represents the semantic characteristic of the textual content and is served as the embedding of the query.

After embeddings are created, additional machine learning models may be used to determine the intent of the user. In various embodiments, the training techniques for a machine learning model may be supervised, semi-supervised, or unsupervised. In supervised learning, the machine learning models may be trained with a set of training samples that are labeled. For example, for a machine learning model trained to predict the intent of the query, the training samples may be past queries and user's selected actions or records of the query result. In training a machine learning model for identifying query intents, the training samples may also include contextual data, such as profile information of the user, past queries of the user, other metadata of the user, of those queries. In some cases, an unsupervised learning technique may be used. The samples used in training are not labeled. Various unsupervised learning techniques such as clustering may be used. For example, queries may follow certain patterns and may be clustered together by an unsupervised learning technique. In some cases, the training may be semi-supervised with a training set having a mix of labeled samples and unlabeled samples.

A machine learning model may be associated with an objective function, which generates a metric value that describes the objective goal of the training process. For example, the training may intend to reduce the error rate of the model in predicting the intents of the queries. In such a case, the objective function may monitor the error rate of the machine learning model. Such an objective function may be called a loss function. Other forms of objective functions may also be used, particularly for unsupervised learning models whose error rates are not easily determined due to the lack of labels. In transaction prediction, the objective function may correspond to the difference between the model's predicted outcomes and the manually recorded outcomes in the training sets. In various embodiments, the error rate may be measured as cross-entropy loss, L1 loss (e.g., the sum of absolute differences between the predicted values and the actual value), L2 loss (e.g., the sum of squared distances).

In some embodiments, the training of a machine learning model may include receiving a set of training samples that include queries input by users and intent labels corresponding to the queries and converting the queries to embeddings. The genealogy online system 130 may input input, in a forward propagation, the embeddings to the machine learning language model to predict intents. The genealogy online system 130 may compare the predicted intents with the intent labels. The genealogy online system 130 may backpropagate comparison results to the machine learning language model to adjust one or more parameters of the machine learning language model.

Figure 5:
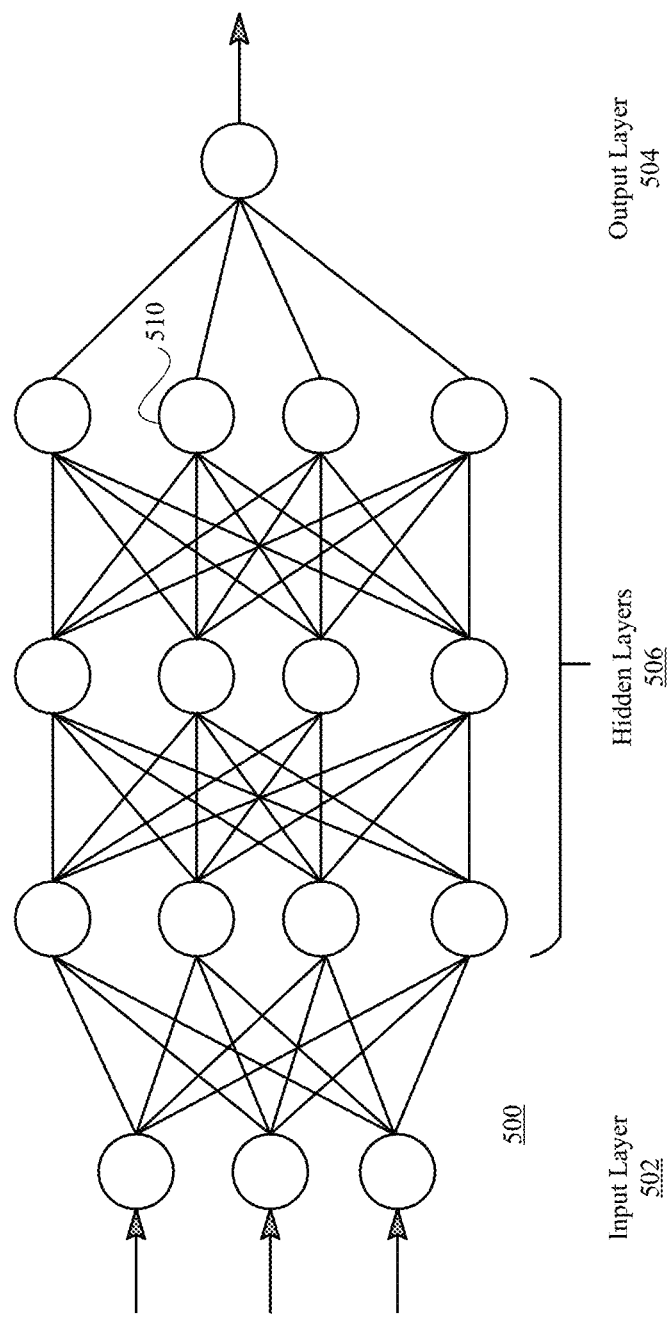
FIG. 5 shows a conceptual diagram illustrating a structure of an example neural network, in accordance with some embodiments.

Referring to FIG. 5, a structure of an example neural network is illustrated, in accordance with some embodiments. A first neural network may be used to generate embedding and a second neural network may be used to predict intents of the queries. The neural network 500 may receive an input and generate an output. The neural network 500 may include different kinds of layers, such as convolutional layers, pooling layers, recurrent layers, full connected layers, and custom layers. A convolutional layer convolves the input of the layer (e.g., an image) with one or more kernels to generate different types of images that are filtered by the kernels to generate feature maps. Each convolution result may be associated with an activation function. A convolutional layer may be followed by a pooling layer that selects the maximum value (max pooling) or average value (average pooling) from the portion of the input covered by the kernel size. The pooling layer reduces the spatial size of the extracted features. In some embodiments, a pair of convolutional layer and pooling layer may be followed by a recurrent layer that includes one or more feedback loop. The feedback may be used to account for spatial relationships of the features or temporal relationships of the objects. For example, the word embeddings in a query may be considered as a sequence. The layers and may be followed in multiple fully connected layers that have nodes connected to each other. The fully connected layers may be used for classification and object detection. In one embodiment, one or more custom layers may also be presented for the generation of a specific format of output.

The order of layers and the number of layers of the neural network 500 may vary in different embodiments. In various embodiments, a neural network 500 includes one or more layers 502, 504, and 506, but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels (e.g., 3×3, 5×5, 7×7, etc.) and the numbers of kernels allowed to be learned may be different from other convolutional layers.

A machine learning model may include certain layers, nodes, kernels and/or coefficients. Training of a neural network, may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other images in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be iteratively performed. Training may be completed when the objective function has become sufficiently stable (e.g., the machine learning model has converged) or after a predetermined number of rounds for a particular set of training samples. The trained machine learning model can be used for performing prediction or another suitable task for which the model is trained.

Computing Machine Architecture

Figure 6:
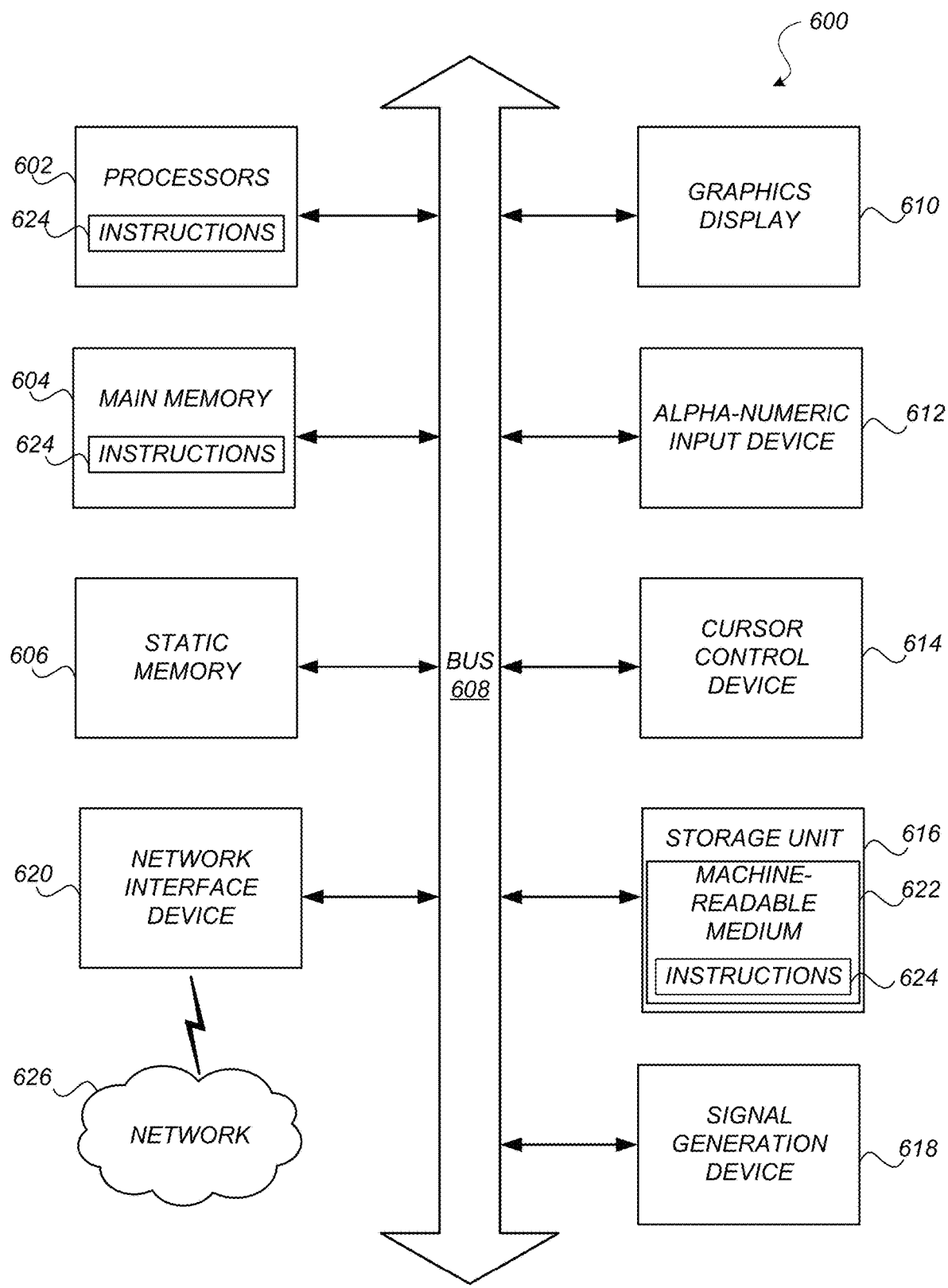
FIG. 6 is a block diagram illustrating components of an example computing machine that is capable of reading instructions from a computer-readable medium and executing them in a processor (or controller).

FIG. 6 is a block diagram illustrating components of an example computing machine that is capable of reading instructions from a computer-readable medium and execute them in a processor (or controller). A computer described herein may include a single computing machine shown in FIG. 6, a virtual machine, a distributed computing system that includes multiple nodes of computing machines shown in FIG. 6, or any other suitable arrangement of computing devices.

By way of example, FIG. 6 shows a diagrammatic representation of a computing machine in the example form of a computer system 600 within which instructions 624 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 6 may correspond to any software, hardware, or combined components shown in FIGS. 1 and 2, including but not limited to, the client device 110, the genealogy online system 130, and various engines, interfaces, terminals, and machines shown in FIG. 2. While FIG. 6 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 624 that specify actions to be taken by that machine. Further, while only a single machine is illustrated, the term "machine" and "computer" may also be taken to include any collection of machines that individually or jointly execute instructions 624 to perform any one or more of the methodologies discussed herein.

The example computer system 600 includes one or more processors 602 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 600 may also include a memory 604 that store computer code including instructions 624 that may cause the processors 602 to perform certain actions when the instructions are executed, directly or indirectly by the processors 602. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 602 and reduces the space required for the memory 604. For example, the database processing techniques and machine learning methods described herein reduce the complexity of the computation of the processors 602 by applying one or more novel techniques that simplify the steps in training, reaching convergence, and generating results of the processors 602. The algorithms described herein also reduces the size of the models and datasets to reduce the storage space requirement for memory 604.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors.

The computer system 600 may include a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The graphics display unit 610, controlled by the processors 602, displays a graphical user interface (GUI) to display one or more results and data generated by the processes described herein. The computer system 600 may also include alphanumeric input device 612 (e.g., a keyboard), a cursor control device 614 (e.g., a mouse, a trackball, a joystick, a motion sensor, or other pointing instruments), a storage unit 616 (a hard drive, a solid-state drive, a hybrid drive, a memory disk, etc.), a signal generation device 618 (e.g., a speaker), and a network interface device 620, which also are configured to communicate via the bus 608.

The storage unit 616 includes a computer-readable medium 622 on which is stored instructions 624 embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting computer-readable media. The instructions 624 may be transmitted or received over a network 626 via the network interface device 620.

While computer-readable medium 622 is shown in an example embodiment to be a single medium, the term "computer-readable medium" should be taken to include a single medium or multiple media (e.g., a centralized or distributed database, or associated caches and servers) able to store instructions (e.g., instructions 624). The computer-readable medium may include any medium that is capable of storing instructions (e.g., instructions 624) for execution by the processors (e.g., processors 602) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Patent Publication Application No., entitled "Linking Individual Datasets to a Database," US2021/0216556, published on Jul. 15, 2021, and (7) U.S. Pat. No. 10,692,587, entitled "Global Ancestry Determination System," granted on Jun. 23, 2020.

What is claimed is:

1. A computer-implemented method for linking a natural-language user query at a genealogy online system to a specific preexisting function of the genealogy online system, the computer-implemented method comprising:

causing to display, at a graphical user interface associated with a genealogy online system, a search box, the genealogy online system configured to provide functions comprising family-tree building and historical record search;

receiving a query from a user entered at the search box;

using a machine learning language model to determine an intent of the user associated with the query, the machine learning language model being trained to receive a query and classify the query to an intent mappable to a plurality of functions of the genealogy online system, wherein the machine learning language model is a transformer model, mapping the determined intent from the machine learning language model to a plurality of functions of a predetermined table of intents and associated functions of the genealogy online system, outputting a prediction regarding the mapped plurality of functions of the genealogy online system based on the mapping of the determined intent of the user; and causing to display, at the graphical user interface as a result of the query, one or more links to the predicted one or more functions of the genealogy online system based on the intent determined by the machine learning language model.

2. The computer-implemented method of claim 1, wherein training of the machine learning language model comprises:

receiving a set of training samples that include queries input by users and intent labels corresponding to the queries;

converting the queries to embeddings;

inputting, in a forward propagation, the embeddings to the machine learning language model to predict intents;

comparing the predicted intents with the intent labels; and backpropagating comparison results to the machine learning language model to adjust one or more parameters of the machine learning language model.

3. The computer-implemented method of claim 1, further comprising:

converting the query from the user that is in natural language to a structured query using a second machine learning language model;

determining the intent of the query using the machine learning language model;

launching a function of the genealogy online system; and automatically sending the structured query to the function to generate a query result.

4. The computer-implemented method of claim 1, wherein the functions of the genealogy online system comprises: a family tree viewer, a genealogical record research interface, a user profile setting, and a genetic data analysis tool.

5. The computer-implemented method of claim 1, wherein the search box is located in a first webpage domain and the one or more functions of the genealogy online system are associated with second webpage domains that are different from the first webpage domain.

6. The computer-implemented method of claim 1, wherein the search box is located on a landing page of the genealogy online system.

7. The computer-implemented method of claim 1, wherein the machine learning language model is provided by a third party and the genealogy online system communicates with the machine learning language model via an Application Programming Interface (API).

8. The computer-implemented method of claim 1, wherein the machine learning language model is fine-tuned with domain-specific data of the genealogy online system.

9. The computer-implemented method of claim 1, wherein a relative of the user is identified based on the determined intent of the natural-language user query from a stitched genealogical tree database.

10. The computer-implemented method of claim 1, wherein the machine learning language model is further configured to:

extract a plurality of entities and corresponding relationships from the natural-language user query, and pre-populate a person-search query of a records database of the genealogy online system.

11. The computer-implemented method of claim 1, wherein the machine learning language model comprises two machine learning model layers, wherein a first machine learning model layer of the machine learning language model detects the intent of the natural-language user query, and wherein a second machine learning model layer of the machine learning language model determines that the natural-language user query pertains to a person, the second machine learning language model determining that the natural-language user query pertains to a person by extracting at least one entity from the natural-language user query.

12. The computer-implemented method of claim 11, wherein:
the second machine learning language model layer is first utilized to determine that the natural-language user query pertains to the person, and
the first machine learning language model layer detects the intent of the natural-language user query at least in part based on the determination that the natural-language user query pertains to the person.

13. The computer-implemented method of claim 1, further comprising:
updating the predetermined table of intents and associated functions of the genealogy online system based on an interaction of the user with the displayed one or more links.

14. The computer-implemented method of claim 1, wherein the predicted one or more functions of the genealogy online system comprises a genetic data analysis tool.

15. The computer-implemented method of claim 1, wherein the prediction regarding the mapped one or more functions of the genealogy online system is additionally based on profile data extracted from a user profile of the user.

16. A system for linking a natural-language user query at a genealogy online system to a specific preexisting function of the genealogy online system, the system comprising:
a machine learning language model; and
a genealogy online system to provide functions comprising family-tree building and historical record search, the genealogy online system comprising memory and one or more processors, the memory configured to store code comprising instructions, the instructions, when executed by the one or more processors, cause the one or more processors to perform steps comprising:
causing to display, at a graphical user interface, a search box for receiving a query from a user entered at the search box;
using the machine learning language model to determine an intent of the user associated with the query, the machine learning language model being trained to receive a query and classify the query to an intent mappable to a plurality of functions of the genealogy online system, wherein the machine learning language model is a transformer model,
mapping the determined intent from the machine learning language model to a plurality of functions of a predetermined table of intents and associated functions of the genealogy online system,
outputting a prediction regarding the mapped plurality of functions of the genealogy online system based on the mapping of the determined intent of the user; and
causing to display, at the graphical user interface as a result of the query, one or more links to one or more functions of the genealogy online system based on the intent determined by the machine learning language model.

17. The system of claim 16, wherein training of the machine learning language model comprises:
receiving a set of training samples that include queries input by users and intent labels corresponding to the queries;
converting the queries to embeddings;
inputting, in a forward propagation, the embeddings to the machine learning language model to predict intents;
comparing the predicted intents with the intent labels; and
backpropagating comparison results to the machine learning language model to adjust one or more parameters of the machine learning language model.

18. A system for linking a natural-language user query at a genealogy online system to a specific preexisting function of the genealogy online system comprising:
a graphical user interface configured to display a search box for receiving a query from a user entered at the search box; and
a genealogy online system to provide functions comprising family-tree building and historical record search, the genealogy online system comprising memory and one or more processors, the memory configured to store code comprising instructions, the instructions, when executed by the one or more processors, cause the one or more processors to perform steps comprising:
using a machine learning language model to determine an intent of the user associated with the query, the machine learning language model being trained to receive a query and classify the query to an intent mappable to a plurality of functions of the genealogy online system, wherein the machine learning language model is a transformer model,
mapping the determined intent from the machine learning language model to a plurality of functions of a predetermined table of intents and associated functions of the genealogy online system,
outputting a prediction regarding the mapped plurality of functions of the genealogy online system based on the mapping of the determined intent of the user; and
causing to display, at the graphical user interface as a result of the query, one or more links to one or more functions of the genealogy online system based on the intent determined by the machine learning language model.

19. The system of claim 18, wherein the steps further comprise:
converting the query from the user that is in natural language to a structured query using a second machine learning language model;
determining the intent of the query using the machine learning language model;
launching a function of the genealogy online system; and
automatically sending the structured query to the function to generate a query result.

20. The system of claim 18, wherein the search box is located in a first webpage domain and the one or more functions of the genealogy online system are associated with second webpage domains that are different from the first webpage domain.

21. The system of claim 18, wherein the machine learning language model is fine-tuned with domain-specific data of the genealogy online system.

* * * * *